(12) United States Patent
Kaneko

(10) Patent No.: US 10,000,722 B2
(45) Date of Patent: Jun. 19, 2018

(54) REFRIGERATION MACHINE OIL COMPOSITION

(71) Applicant: IDEMITSU KOSAN CO., LTD., Chiyoda-ku (JP)

(72) Inventor: Masato Kaneko, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days. days.

(21) Appl. No.: 14/916,128

(22) PCT Filed: Sep. 8, 2014

(86) PCT No.: PCT/JP2014/073715
§ 371 (c)(1),
(2) Date: Mar. 2, 2016

(87) PCT Pub. No.: WO2015/037563
PCT Pub. Date: Mar. 19, 2015

(65) Prior Publication Data
US 2016/0215235 A1    Jul. 28, 2016

(30) Foreign Application Priority Data
Sep. 12, 2013 (JP) ................................ 2013-189266

(51) Int. Cl.
C09K 5/04      (2006.01)
C10M 171/00    (2006.01)
C10M 111/04    (2006.01)

(52) U.S. Cl.
CPC ......... *C10M 171/008* (2013.01); *C09K 5/045* (2013.01); *C10M 111/04* (2013.01); *C09K 2205/126* (2013.01); *C10M 2207/026* (2013.01); *C10M 2207/042* (2013.01); *C10M 2207/2835* (2013.01); *C10M 2209/1033* (2013.01); *C10M 2209/1045* (2013.01); *C10M 2209/1055* (2013.01); *C10M 2223/041* (2013.01); *C10N 2220/022* (2013.01); *C10N 2220/024* (2013.01); *C10N 2220/301* (2013.01); *C10N 2220/302* (2013.01); *C10N 2230/02* (2013.01); *C10N 2230/08* (2013.01); *C10N 2230/10* (2013.01); *C10N 2240/30* (2013.01)

(58) Field of Classification Search
CPC .......... C10M 111/04; C10M 2205/003; C10M 2207/2835; C10M 2207/2815; C09K 5/045; C09K 2205/126; C09K 2205/22
See application file for complete search history.

(56) References Cited

U.S. PATENT DOCUMENTS

| | | | |
|---|---|---|---|
| 6,153,118 | A | 11/2000 | Hasegawa et al. |
| 2010/0108936 | A1 | 5/2010 | Kaneko |
| 2011/0011124 | A1 | 1/2011 | Matsuura et al. |

FOREIGN PATENT DOCUMENTS

| | | | |
|---|---|---|---|
| CN | 101528903 | A | 9/2009 |
| CN | 101883957 | A | 11/2010 |
| EP | 0 461 262 | A1 | 12/1991 |
| EP | 1 243 639 | A1 | 9/2002 |
| EP | 2 236 589 | A1 | 10/2010 |
| JP | 3-200895 | A | 9/1991 |
| JP | 10-168479 | A | 6/1998 |
| JP | 2008-115266 | A | 5/2008 |
| WO | 91/09097 | A1 | 6/1991 |
| WO | 01/48127 | A1 | 7/2001 |
| WO | 2009/072314 | A1 | 6/2009 |
| WO | 2009/116282 | A1 | 9/2009 |
| WO | WO 2013/110867 | A1 | 8/2013 |

OTHER PUBLICATIONS

International Search Report dated Nov. 25, 2014 in PCT/JP2014/073715 filed Sep. 8, 2014.
Extended European Search Report dated Jan. 20, 2017 in Patent Application No. 14844461.5.
"Ze-GLES RB" Retrieved from Internet:: http://www.noe.jx-group.co.jp/business/lubricants_e/pdf/guidesheet/ind-1005-1601.pdf, XP055332195, Jan. 4, 2017, 2 pages.
Christian Puhl "Refrigeration Oils for Future Mobile A/C Systems" R&D Refrigeration Oils Fuchs Europe Schmierstoffe, XP002685321, Feb. 11-12, 2009, pp. 1-18.
Chinese Office Action dated Apr. 28, 2018 in Chinese Patent Application No. 201480049274.8 filed Sep. 8, 2014.

*Primary Examiner* — John R Hardee
(74) *Attorney, Agent, or Firm* — Oblon, McClelland, Maier & Neustadt, L.L.P.

(57) ABSTRACT

The refrigerator oil composition of the present invention is for a refrigerator in which a refrigerant containing as a major component at least one of a fluorine-containing organic compound selected from a compound represented by the following molecular formula (A) is used: $C_pF_rR_s$ (A), wherein R represents Cl, Br, I, or H; p represents an integer of from 2 to 6; r represents an integer of from 1 to 12; and s represents an integer of from 0 to 11, provided that the molecule has one or more carbon-carbon unsaturated bond, and the composition contains a polyol ester compound and a polyoxyalkylene glycol compound as a base oil in a mass ratio of from 10/90 to 98/2.

14 Claims, No Drawings

REFRIGERATION MACHINE OIL COMPOSITION

TECHNICAL FIELD

The present invention relates to a refrigerator oil composition used for mixing with various refrigerants in the field of refrigeration, and especially, a refrigerator oil composition which is applied to a car air-conditioner, such as an electric car air-conditioner and an open type car air-conditioner.

BACKGROUND ART

In general, a refrigerator is composed of at least a compressor, a condenser, an expansion mechanism (such as an expansion valve), and an evaporator, or furthermore by a dryer, and has a structure that a mixed liquid of a refrigerant and a lubricant oil (i.e., a refrigerator oil) is circulated in the closed system. As the refrigerant for a refrigerator, a chlorine-containing compound, such as a chlorofluorocarbon, has been widely used, but in consideration of the environment protection, it is being replaced by a compound containing no chlorine, such as a hydrofluorocarbon (HFC), and a natural refrigerant, such as carbon dioxide. Examples of the hydrofluorocarbon in practical use include a saturated hydrofluorocarbon (which may be hereinafter referred to as a saturated HFC), which is represented by 1,1,1,2-tetrafluoroethane, difluoromethane, pentafluoroethane, and 1,1,1-trifluoroethane (which are referred to as R134a, R32, R125, and R143a, respectively).

Various investigations have been made on a refrigerator oil composition that is suitable for a saturated HFC and a carbon dioxide refrigerant. For example, PTL 1 discloses that a refrigerator oil composition in which a polyhydric alcohol partial fatty acid ester, and a phosphate compound and so on are blended to at least one selected from a polyoxyalkylene glycol compound and an ester compound. PTL 1 shows that the use of the refrigerator oil composition enhances the wear-resistant properties and the lubricating performance while increasing the compatibility of the refrigerator oil with a saturated HFC.

Furthermore, for example, PTL 2 discloses that a refrigerator oil composition for a carbon dioxide refrigerant, in which a carbonyl carbonate derivative and/or a polyol ester is blended to a polyoxyalkylene glycol, thereby improving the compatibility with a carbon dioxide refrigerant and also enhancing the wear-resistant properties and the lubricating performance.

However, under the current situation, carbon dioxide, which requires high pressure, cannot be used as a major component of a refrigerant for a car air-conditioner, and a saturated HFC is being avoided due to the high global warming potential thereof. In recent years, the use of an unsaturated fluorinated hydrocarbon compound, such as HFO1234ze and HFO1234yf, is being considered as a refrigerant that is capable of being used for the current car air-conditioner system, irrespective of the low global warming potential thereof.

Examples of the refrigerator oil that is used for a refrigerant composed of an unsaturated fluorinated hydrocarbon compound include oxygen-containing compounds, such as a polyoxyalkylene glycol compound, a polyol ester compound and a polycarbonate compound (see, for example, PTL 3). Among these base oils, the polyoxyalkylene glycol compound is excellent in thermal stability and is being studied for the purpose in an open type car air-conditioner. The polyol ester compound is being mainly studied for the purpose in an electric car air-conditioner equipped with a motor therein due to the high volume resistivity thereof.

CITATION LIST

Patent Literatures

PTL 1: WO 91/09097 A
PTL 2: WO 01/048127 A
PTL 3: JP A 2008-115266 A

SUMMARY OF INVENTION

Technical Problem

However, in the cold regions with an outside air temperature below −30° C., a polyol ester compound gets lower flowability, which may cause lubrication failure. On the other hand, a polyoxyalkylene glycol compound has high low-temperature flowability and can exhibit good lubricating performance under a low temperature environment, but there is a possibility that a trouble in an electric system is caused due to the low volume resistivity thereof. Namely, the ordinary refrigerator oils used in a car air-conditioner cannot simultaneously have both a favorable volume resistivity and favorable low-temperature flowability, and thus may fail to exhibit sufficient performance in cold regions and the like.

Furthermore, the refrigerator oils described in PTLs 1 and 2 each are a refrigerator oil for carbon dioxide or a saturated HFC, and are improved only in the compatibility, the wear-resistant properties and the lubricating performance. PTLs 1 and 2 do not show that the improvement of the volume resistivity and the low-temperature flowability is achieved by adjusting the formulation of the refrigerator oil that is used for an unsaturated HFC.

The present invention has been made in consideration of the aforementioned problems, and an object thereof is to provide a refrigerator oil composition that is capable of having good low-temperature flowability while having a high volume resistivity.

Solution to Problem

As a result of earnest investigations made by the present inventors, it has been found that the aforementioned problems can be solved by incorporating a polyoxyalkylene glycol compound and a polyol ester compound as a base oil in a prescribed mass ratio, into a refrigerator oil composition that is used in mixing with an unsaturated HFC refrigerant, and thus the present invention described below has been completed.

(1) A refrigerator oil composition for a refrigerator in which a refrigerant containing as a major component at least one of a fluorine-containing organic compound selected from a compound represented by the following molecular formula (A) is used:

$$C_pF_rR_s \qquad (A)$$

wherein R represents Cl, Br, I, or H; p represents an integer of from 2 to 6; r represents an integer of from 1 to 12; and s represents an integer of from 0 to 11, provided that the molecule has one or more carbon-carbon unsaturated bond, the refrigerator oil composition containing a polyol ester compound and a polyoxyalkylene glycol compound as a base oil in a mass ratio of from 10/90 to 98/2.

(2) The refrigerator oil composition according to the item (1), wherein the polyol ester compound is an ester of a hindered alcohol.

(3) The refrigerator oil composition according to the item (1) or (2), wherein the polyol ester compound is an ester of a branched and/or linear fatty acid having a number of carbon atoms of from 4 to 20.

(4) The refrigerator oil composition according to the item (3), wherein the polyol ester compound is an ester of a branched fatty acid having a number of carbon atoms of from 6 to 10.

(5) The refrigerator oil composition according to any one of the items (1) to (4), wherein the polyoxyalkylene glycol compound is selected from polyoxypropylene glycol dimethyl ether and polyoxypropylene-polyoxyethylene copolymer dimethyl ether.

(6) The refrigerator oil composition according to any one of the items (1) to (5), wherein the refrigerator oil composition has a BF viscosity at −30° C. of 100,000 mPa·s or less and a volume resistivity of $2.0 \times 10^8$ Ω·m or more.

(7) The refrigerator oil composition according to any one of the items (1) to (6), wherein a mixture of the polyol ester compound and the polyoxyalkylene glycol compound has a kinetic viscosity at 100° C. of from 2 to 50 mm$^2$/s.

(8) The refrigerator oil composition according to any one of the items (1) to (7), wherein the polyol ester compound has a hydroxyl value of 5 mgKOH/g or less and an acid value of 0.1 mgKOH/g or less.

(9) The refrigerator oil composition according to any one of the items (1) to (8), wherein the refrigerator oil composition has a water content of less than 1,000 ppm.

(10) The refrigerator oil composition according to any one of the items (1) to (9), wherein the refrigerator oil composition further contains at least one selected from the group consisting of an antioxidant, an extreme pressure agent, an oily agent, an acid scavenger, an oxygen scavenger, a copper deactivator, a rust inhibitor, and a defoaming agent.

(11) The refrigerator oil composition according to any one of the items (1) to (10), wherein the fluorine-containing organic compound is an unsaturated fluorinated hydrocarbon compound.

(12) The refrigerator oil composition according to the item (11), wherein the unsaturated fluorinated hydrocarbon compound is selected from HFO1234yf and HFO1234ze.

(13) The refrigerator oil composition according to any one of the items (1) to (12), wherein the refrigerator oil composition is used for a refrigeration system, a hot water supply system, or a heating system selected from a car air-conditioner, a gas heat pump system, an air conditioner, a refrigerating chamber, an automatic vending machine, and a showcase.

Advantageous Effects of Invention

According to the present invention, a refrigerator oil composition that has good low-temperature flowability while having a high volume resistivity can be provided.

DESCRIPTION OF EMBODIMENTS

Preferred embodiments of the present invention will be described in detail below.
<Refrigerant>

The refrigerant, with which the refrigerator oil composition of the present invention is used, contains as a major component at least one of a fluorine-containing organic compound selected from a compound represented by the following molecular formula (A):

$$C_pF_rR_s \quad (A)$$

wherein R represents Cl, Br, I, or H; p represents an integer of from 2 to 6; r represents an integer of from 1 to 12; and s represents an integer of from 0 to 11, provided that the molecule has one or more carbon-carbon unsaturated bond.

The molecular formula (A) shows the kinds and the numbers of the elements in the molecule, and the formula (A) represents a fluorine-containing organic compound having a number p of carbon atoms C of from 2 to 6. With having a number of carbon atoms of from 2 to 6, the fluorine-containing organic compound can have physical and chemical properties, such as a boiling point, a freezing point and an evaporation latent heat, that are required for a refrigerant.

In the molecular formula (A), the bond types of the p carbon atoms represented by $C_p$ include a carbon-carbon single bond and an unsaturated bond, such as a carbon-carbon double bond. The carbon-carbon unsaturated bond is preferably a carbon-carbon double bond from the standpoint of the stability, and the fluorine-containing organic compound preferably has 1 or more unsaturated bond such as a carbon-carbon double bond in the molecule thereof, with the number thereof being preferably 1. Namely, at least one of the bond types of the p carbon atoms represented by $C_p$ is preferably a carbon-carbon double bond.

In the molecular formula (A), R represents Cl, Br, I, or H, and may be any one of them, and in the case where two or more of R's are present, the atoms represented by R may be the same as or different from each other. For reducing the ozone layer destruction, it is preferred that the atoms represented by R include H, and it is more preferred that all of the atoms represented by R are H.

Preferred examples of the fluorine-containing organic compound represented by the molecular formula (A) include an unsaturated fluorinated hydrocarbon compound.

The compound will be described in detail below.
[Unsaturated Fluorinated Hydrocarbon Compound]

In the present invention, examples of the unsaturated fluorinated hydrocarbon compound to be used as a refrigerant in a refrigerator include an unsaturated fluorinated hydrocarbon compound represented by the molecular formula (A), in which all of the atoms represented by R are H, p is from 2 to 6, r is from 1 to 12, and s is from 1 to 11.

Preferred examples of the unsaturated fluorinated hydrocarbon compound include fluorinated compounds of a linear or branched chain olefin having a number of carbon atoms of from 2 to 6 and a cyclic olefin having a number of carbon atoms of from 4 to 6.

Specific examples thereof include ethylene having from 1 to 3 fluorine atoms introduced therein, propene having from 1 to 5 fluorine atoms introduced therein, butene having from 1 to 7 fluorine atoms introduced therein, pentene having from 1 to 9 fluorine atoms introduced therein, hexene having from 1 to 11 fluorine atoms introduced therein, cyclobutene having from 1 to 5 fluorine atoms introduced therein, cyclopentene having from 1 to 7 fluorine atoms introduced therein, and cyclohexene having from 1 to 9 fluorine atoms introduced therein.

Among these unsaturated fluorinated hydrocarbon compounds, the fluorinated propene is preferred, propene having from 3 to 5 fluorine atoms introduced therein is more preferred, and propene having 4 fluorine atoms introduced therein is the most preferred. Preferred specific compounds thereof include 1,3,3,3-tetrafluoropropene represented by HFO1234ze, and 2,3,3,3-tetrafluoropropene represented by HFO1234yf, and the most preferred specific compound thereof is HFO1234yf.

In the present invention, the unsaturated fluorinated hydrocarbon compound may be used solely or as a combination of two or more kinds thereof.

[Additional Component]

The refrigerant can contain an additional component depending on necessity, in addition to at least one of the fluorine-containing organic compound selected from the compound represented by the molecular formula (A). For example, the refrigerant may contain a saturated fluorinated hydrocarbon compound.

The saturated fluorinated hydrocarbon compound is preferably a fluorinated alkane having a number of carbon atoms of from 2 to 4, examples of which include difluoromethane (R32), which is a fluorinated methane, and 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134) and 1,1,1,2,2-pentafluoroethane (R125), which are a fluorinated ethane. The fluorinated ethane is particularly preferred, with 1,1,1,2-tetrafluoroethane (R134a) being preferred among them. The saturated fluorinated hydrocarbon compound may be used solely or as a combination of two or more kinds thereof.

The refrigerant may contain carbon dioxide, and in this case, the refrigerant preferably contains the unsaturated fluorinated hydrocarbon compound, carbon dioxide, and an additional third component. Specifically, the refrigerant preferably contains 1,3,3,3-tetrafluoropropene (HFO1234ze), carbon dioxide (R-744), and the third component that is selected from difluoromethane (R32), 1,1-difluoroethane (R152a), fluoroethane (R161), 1,1,1,2-tetrafluoroethane (R134a), propylene, propane, and mixtures thereof.

The fact that the refrigerant contains the fluorine-containing organic compound represented by the molecular formula (A) as a major component means that the refrigerant contains the compound in an amount of 50% by mass or more based on the total amount of the refrigerant, and the content thereof is preferably 70% by mass or more, more preferably 80% by mass or more, and further preferably 90% by mass or more, based on the total amount of the refrigerant. The additional component, such as the saturated fluorinated hydrocarbon compound, is preferably not blended, and the refrigerant preferably consists of the unsaturated fluorinated hydrocarbon compound.

<Refrigerator Oil Composition>

The refrigerator oil composition of the present invention may be composed of the base oil only, but various additives may be blended to the base oil. The components of the refrigerator oil composition will be described in detail below.

[Base Oil]

In the present invention, the base oil contains a polyol ester compound and a polyoxyalkylene glycol compound. These components will be described in more detail below.

(Polyol Ester Compound (POE))

The polyol ester compound used is preferably an ester of a dihydric to eicosahydric alcohol, preferably a dihydric to decahydric alcohol, and a fatty acid. Examples of the diol, which is the dihydric alcohol, include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol and 1,12-dodecanediol.

Examples of the polyol, which is the trihydric or higher hydric alcohol, include a polyhydric alcohol, such as trimethylolethane, trimethylolpropane, trimethylolbutane, di(trimethylolpropane), tri(trimethylolpropane), pentaerythritol, di(pentaerythritol), tri(pentaerythritol), glycerin, polyglycerin (a dimer to a eicosamer of glycerin), 1,3,5-pentanetriol, sorbitol, sorbitan, sorbitol-glycerin condensate, adonitol, arabitol, xylitol and mannitol, and a saccharide, such as xylose, arabinose, ribose, rhamnose, glucose, fructose, galactose, mannose, sorbose, cellobiose, maltose, isomaltose, trehalose, sucrose, raffinose, gentianose and melezitose, and partially etherified products of these compounds, and methylglucoside (glycoside).

Among the aforementioned compounds, an ester of a hindered alcohol, such as trimethylolethane, trimethylolpropane, trimethylolbutane, di(trimethylolpropane), tri(trimethylolpropane), pentaerythritol, di(pentaerythritol) and tri(pentaerythritol), is preferred, and an ester of pentaerythritol, di(pentaerythritol), or trimethylolpropane is more preferred, due to the excellent oxidation stability thereof, and is most preferably pentaerythritol from the standpoint of the compatibility with the refrigerant and the easiness in enhancement of the oxidation stability.

The fatty acid is not particularly limited in the number of carbon atoms, but a fatty acid having a number of carbon atoms of from 4 to 20 is generally used. Among the fatty acids having a number of carbon atoms of from 4 to 20, a fatty acid having a number of carbon atoms of 6 or more is preferred, and a fatty acid having a number of carbon atoms of 8 or more is more preferred, from the standpoint of the lubricating property and the easiness in increasing the inflammation point. From the standpoint of the compatibility with the refrigerant, a fatty acid having a number of carbon atoms of 18 or less is preferred, a fatty acid having a number of carbon atoms of 12 or less is more preferred, and a fatty acid having a number of carbon atoms of 10 or less is further preferred.

The fatty acid may be any of a linear fatty acid and a branched fatty acid, and a branched fatty acid is preferred from the standpoint of the easiness in enhancing the oxidation stability and the like.

Examples of the fatty acid include straight-chains or branches of pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid and oleic acid, and a so-called neo-acid having a quaternary carbon atom as the α-carbon atom.

Specific examples thereof include valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), lauric acid (n-dodecanoic acid), myristic acid (n-tetradecanoic acid), palmitic acid (n-hexadecanoic acid), stearic acid (n-octadecanoic acid), oleic acid (cis-9-octadecenoic acid), isopentanoic acid (3-methylbutanoic acid), 2-methylhexanoic acid, 2-ethylpentanoic acid, 2-ethylhexanoic acid and 3,5,5-trimethylhexanoic acid, and among these, a branched fatty acid having a number of carbon atoms of approximately from 6 to 10, such as 2-methylhexanoic acid, 2-ethylpentanoic acid, 2-ethylhexanoic acid 3,5,5-trimethylhexanoic acid, is preferred, and a branched fatty acid having a number of carbon atoms of approximately from 7 to 9, such as 2-ethylhexanoic acid and 3,5,5-trimethylhexanoic acid, is more preferred.

Preferred examples of the polyol ester include esters of the hindered alcohols and the branched fatty acids, which are described above, and preferred specific examples thereof include a triester of trimethylolpropane and one or more kinds of fatty acids selected from 2-methylhexanoic acid, 2-ethylpentanoic acid, 2-ethylhexanoic acid and 3,5,5-trimethylhexanoic acid, a tetraester of pentaerythritol and one or more kinds of fatty acids selected from 2-methylhexanoic acid, 2-ethylpentanoic acid, 2-ethylhexanoic acid and 3,5,5-trimethylhexanoic acid, and a hexaester of di(pentaerythritol) and one or more kinds of fatty acids selected from 2-methylhexanoic acid, 2-ethylpentanoic acid, 2-ethylhexanoic acid and 3,5,5-trimethylhexanoic acid.

Among these, an ester of a hindered alcohol selected from pentaerythritol and di(pentaerythritol) and a branched fatty acid selected from 2-ethylhexanoic acid and 3,5,5-trimethylhexanoic acid is more preferred.

The polyol ester compound used may be an ester of only one kind of the fatty acid, but is preferably an ester of two or more kinds of the fatty acids. The ester of two or more kinds of the fatty acids may be a mixture of two or more kinds of the esters of one kind of the fatty acid and the polyol, but is preferably an ester of the mixed fatty acid containing two or more kinds thereof and the polyol since it is excellent in the low temperature characteristics and the compatibility with the refrigerant.

In this way, when two kinds of the fatty acids are used by mixing, the ratio (molar ratio) of one of the fatty acids to the other fatty acid is preferably from 0.5 to 2, and more preferably from 0.6 to 1.7.

A mixture of the esters of two or more kinds of the polyols is also preferred.

Specific examples thereof include a mixture of the ester of pentaerythritol and the ester of di(pentaerythritol). More specific preferred examples thereof include a mixture of an ester of pentaerythritol and one or more kinds of branched fatty acids having a number of carbon atoms of from 8 to 9, selected from 2-ethylhexanoic acid, 3,5,5-trimethylhexanoic acid and so on, and an ester of di(pentaerythritol) and one or more kinds of branched fatty acids having a number of carbon atoms of from 8 to 9, selected from 2-ethylhexanoic acid, 3,5,5-trimethylhexanoic acid and so on. The use of this type of mixture can improve the low-temperature flowability while increasing the volume resistivity. The mixing ratio herein is preferably higher for pentaerythritol in terms of molar ratio of alcohol, and the ratio of pentaerythritol/di(pentaerythritol) (molar ratio) is preferably from 2 to 10, and more preferably from 3 to 7.

The polyol ester compound may be a partial ester with all the hydroxyl groups of the polyol that are not entirely esterified, a full ester with all the hydroxyl group that are esterified, or a mixture of the partial ester and the full ester, and is preferably the full ester.

In the present invention, the polyol ester compound may be used solely or as a combination of two or more kinds thereof.

The polyol ester compound in the present invention preferably has a kinetic viscosity at 40° C. of from 30 to 120 mm²/s, and more preferably from 40 to 100 mm²/s, from the standpoint of enhancing the volume resistivity and improving the viscosity characteristics.

The polyol ester compound in the present invention preferably has a hydroxyl value of 5 mgKOH/g or less. When the hydroxyl value is 5 mgKOH/g or less, the polyol ester compound can be suitably prevented from being decomposed, so as to improve the stability of the refrigerator oil composition. In this point of view, the hydroxyl value of the polyol ester compound is more preferably 4 mgKOH/g or less, and further preferably 3.5 mgKOH/g or less.

The polyol ester compound preferably has an acid value of 0.1 mgKOH/g or less, and more preferably 0.05 mgKOH/g or less, from the standpoint of preventing the decomposition thereof for enhancing the stability of the refrigerator oil composition.

The polyol ester compound preferably has an iodine value of 2.5 or less, and more preferably 2.1 or less, from the standpoint of enhancing the stability of the refrigerator oil composition.

(Polyoxyalkylene Glycol Compound (PAG))

In the refrigerator oil composition of the present invention, examples of the polyoxyalkylene glycol compound that can be used as the base oil include a compound represented by the general formula (I);

wherein $R^1$ represents a hydrogen atom, an alkyl group having a number of carbon atoms of from 1 to 10, an acyl group having a number of carbon atoms of from 2 to 10, an organic group having a number of carbon atoms of from 3 to 15 containing a heterocyclic ring, or an aliphatic hydrocarbon group having a number of carbon atoms of from 1 to 10 and having from 2 to 6 bonding sites; $R^2$ represents an alkylene group having a number of carbon atoms of from 2 to 4; $R^3$ represents a hydrogen atom, an alkyl group having a number of carbon atoms of from 1 to 10, an acyl group having a number of carbon atoms of from 2 to 10, or an organic group having a number of carbon atoms of from 3 to 15 containing a heterocyclic ring; n represents an integer of from 1 to 6; and m represents a number that provides an average value of m×n of from 6 to 80.

In the general formula (I), the alkyl group for $R^1$ and $R^3$ may be any of linear, branched and cyclic. Specific examples of the alkyl group include a methyl group, an ethyl group, a n-propyl group, an isopropyl group, various butyl groups, various pentyl groups, various hexyl groups, various heptyl groups, various octyl groups, various nonyl groups, various decyl groups, a cyclopentyl group and a cyclohexyl group. With the alkyl group having a number of carbon atoms or 10 or less, the compatibility thereof with the refrigerant can be improved to prevent phase separation and the like from occurring. The number of carbon atoms of the alkyl group is preferably from 1 to 6, more preferably from 1 to 3, and most preferably 1.

The alkyl group moiety of the acyl group for $R^1$ and $R^3$ may be any of linear, branched and cyclic. Specific examples of the alkyl group moiety of the acyl group include the same groups each having a number of carbon atoms of from 1 to 9 as those described for the specific examples of the alkyl group. With the acyl group having a number of carbon atoms or 10 or less, the compatibility thereof with the refrigerant can be improved to prevent phase separation from occurring. The number of carbon atoms of the acyl group is preferably from 2 to 6, and more preferably from 2 to 3.

In the case where both $R^1$ and $R^3$ each are an alkyl group or an acyl group, the groups represented by $R^1$ and $R^3$ may be the same as or different from each other.

In the case where n is 2 or more, the plural groups represented by $R^3$ in one molecule may be the same as or different from each other.

In the case where $R^1$ is an aliphatic hydrocarbon group having a number of carbon atoms of from 1 to 10 and having from 2 to 6 bonding sites, the aliphatic hydrocarbon group may be a chain or cyclic. Examples of the aliphatic hydrocarbon group having 2 bonding sites include an ethylene group, a propylene group, a butylene group, a pentylene group, a hexylene group, a heptylene group, an octylene group, a nonylene group, a decylene group, a cyclopentylene group and a cyclohexylene group. Examples of the aliphatic hydrocarbon group having from 3 to 6 bonding sites include a residual group obtained by removing hydroxyl groups from a polyhydric alcohol, such as trimethylolpropane, glycerin, pentaerythritol, sorbitol, 1,2,3-trihydroxycyclohexane and 1,3,5-trihydroxycyclohexane.

With the aliphatic hydrocarbon group having a number of carbon atoms of 10 or less, the compatibility thereof with the refrigerant can be improved to prevent phase separation from occurring. The number of carbon atoms is preferably from 2 to 6.

In the organic group having a number of carbon atoms of from 3 to 15 containing a heterocyclic ring, the hetero atom of the heterocyclic ring is oxygen and/or sulfur. The heterocyclic ring may be saturated or unsaturated, and may be a saturated cyclic ether or a saturated cyclic thioether. The cyclic compound may be substituted or unsubstituted. In the case where it is substituted, the heterocyclic ring may be bonded to the oxygen atom through the substituent or one arbitrary substituent, and in this case, the substituent may be a hydrocarbon linkage, such as —$CH_2$—, —$C_2H_4$— or —$C_3H_6$—. It is preferred that a heterocyclic moiety having a number of carbon atoms of from 4 to 6 bonded directly or through a hydrocarbon linkage is contained.

For example, the heterocyclic moiety may be a furan ring or a thiophene ring. The heterocyclic moiety may be from a furfuryl derivative such as furfuryl or tetrahydrofurfuryl alternatively, and may be bonded to the oxygen atom directly or through a hydrocarbon linkage. The original compound, from which $R^1$ and $R^3$ are derived, may contain a tetrahydrofuran, a methyltetrahydrofuran, a tetrahydrothiophene and a methyltetrahydrothiophene substituent. Preferred examples of $R^1$ and $R^3$ include a group that can be derived from 2-hydroxymethyltetrahydrofuran, and in this case, $R^1$ and $R^3$ is a group from methyltetrahydrofuran.

In the general formula (I), $R^2$ represents an alkylene group having a number of carbon atoms of from 2 to 4, and examples of the oxyalkylene group as the repeating unit include an oxyethylene group, an oxypropylene group and an oxybutylene group. The oxyalkylene groups in one molecule may be the same as each other, or two or more kinds of oxyalkylene groups may be contained. It is preferred that at least an oxypropylene unit is contained in one molecule, and it is particularly preferred that an oxypropylene unit is contained in an amount of 50% by mol or more in the oxyalkylene units.

In the general formula (I), n represents an integer of from 1 to 6 and is determined corresponding to the number of the bonding sites of $R^1$. For example, in the case where $R^1$ is an alkyl group or an acyl group, n is 1, and in the case where $R^1$ is an aliphatic hydrocarbon group having 2, 3, 4, 5 or 6 bonding sites, n is 2, 3, 4, 5 or 6, respectively. m represents a number that provides an average value of m×n of from 6 to 80, and when the average value of m×n is in the range, a suitable viscosity can be obtained, and the low-temperature flowability can be improved.

The polyoxyalkylene glycol compound represented by the general formula (I) encompasses a polyoxyalkylene glycol that has a hydroxyl group at an end thereof, which may be preferably used irrespective of the presence of the hydroxyl group, as far as the content of the hydroxyl group is in a ratio of 50% by mol or less based on the total end groups. When the content of the hydroxyl group is 50% by mol or less, the water absorption property can be reduced, preventing the polyol ester compound from being hydrolyzed.

In the general formula (I), n is preferably 1. It is preferred that at least one of $R^1$ and $R^3$ is an alkyl group, it is more preferred that both $R^1$ and $R^3$ each are an alkyl group, and it is most preferred that both of them are methyl groups. In the present invention, when both $R^1$ and $R^3$ each are an alkyl group, particularly a methyl group, the water absorption property can be reduced, preventing the polyol ester compound from being hydrolyzed, and also the viscosity characteristics can be improved, making the low-temperature flowability excellent.

Preferred examples of the polyoxyalkylene glycol compound that is represented by the general formula (I) include polypropylene glycol dimethyl ether, polyethylene-polypropylene glycol copolymer dimethyl ether and polyethylene-polypropylene glycol copolymer methyl butyl ether, and among these, polypropylene glycol dimethyl ether and polyethylene-polypropylene glycol copolymer dimethyl ether are more preferred, and polypropylene glycol dimethyl ether is particularly preferred.

In the present invention, the polyoxyalkylene glycol compound may be used solely or as a combination of two or more kinds thereof.

The polyoxyalkylene glycol compound in the present invention preferably has a kinetic viscosity at 40° C. of from 20 to 100 $mm^2$/s, and more preferably from 30 to 60 $mm^2$/s, for improving the lubricating performance and for improving the low-temperature flowability.

The polyoxyalkylene glycol compound in the present invention preferably has a hydroxyl value of 5 mgKOH/g or less. When the hydroxyl value of 5 mgKOH/g is less, the polyol ester compound can be suitably prevented from being decomposed, so as to improve the stability of the refrigerator oil composition. In this point of view, the hydroxyl value of the polyoxyalkylene glycol compound is more preferably 2 mgKOH/g or less, and further preferably 1.5 mgKOH/g or less.

(Mass Ratio)

In the refrigerator oil composition of the present invention, the mass ratio of the polyol ester compound to the polyoxyalkylene glycol compound (which may be hereinafter referred to as POE/PAG) is from 10/90 to 98/2.

When the mass ratio is less than 10/90, the volume resistivity is low, and in the case where the refrigerator oil composition is applied to a purpose using an electric driving source, such as an electric car air-conditioner, a problem in an electric system, such as a leak current, is liable to occur. When the mass ratio exceeds 98/2, on the other hand, the refrigerator oil composition has low low-temperature flowability, and in the case where the refrigerator oil composition is used in cold regions or the like, such a problem would occur as a deteriorated lubricating performance. In the present invention, POE/PAG is preferably from 30/70 to 95/5 from these standpoints.

In the present invention the content of the polyol ester compound is preferably larger than the content of the polyoxyalkylene glycol compound since the volume resistivity can be notably enhanced without large deterioration of the low-temperature flowability, and specifically the POE/PAG is more preferably 60/40 to 95/5, and further preferably from 70/30 to 90/10.

<Properties of Mixed Base Oil>

In the present invention, the mixture of the polyoxyalkylene glycol compound and the polyol ester compound (which may be hereinafter referred to as a mixed base oil)

preferably has a kinetic viscosity at 100° C. of from 2 to 50 mm²/s, and more preferably from 5 to 30 mm²/s. When the kinetic viscosity is 2 mm²/s or more, a good lubricating performance (load bearing property) can be exhibited, and simultaneously a good sealing property can be obtained. When the kinetic viscosity is 50 mm²/s or less, a good energy saving property can be obtained, and the low-temperature viscosity described later can be easily made to be a desired value or lower.

The mixed base oil preferably has an inflammation point of 160° C. or more, more preferably 180° C. or more, and further preferably 200° C. or more. The mixed base oil preferably has an ignition point (autoignition point) of 350° C. or more, more preferably 380° C. or more, and further preferably 390° C. or more. The inflammation point and the ignition point that are the above lower limit values or more can reduce the possibility of ignition when the refrigerator oil is leaked due to breakage of the refrigerator.

The base oil of the refrigerator oil composition of the present invention is preferably a base oil composed only of a mixture of the polyoxyalkylene glycol compound and the polyol ester compound, but may contain a base oil other than the polyoxyalkylene glycol compound and the polyol ester compound in such a range that does not impair the objects of the present invention.

In this case, the mixed base oil, i.e., the mixture of the polyoxyalkylene glycol compound and the polyol ester compound, is contained as a major component, and specifically the mixed base oil is contained in a ratio of 70% by mass or more based on the total amount of the base oil, whereas the base oil other than the polyoxyalkylene glycol compound and the polyol ester compound is preferably contained in a ratio of 30% by mass or less, and more preferably 10% by mass or less, based on the total amount of the base oil.

Examples of the base oil that can be used in combination with the polyoxyalkylene glycol compound and the polyol ester compound include a polyvinyl ether compound, a polycarbonate compound and a hydrogenated product of an α-olefin oligomer, and also include a mineral oil, an alicyclic hydrocarbon compound and an alkylated aromatic hydrocarbon compound.

<Properties of Refrigerator Oil Composition>

The refrigerator oil composition of the present invention preferably has a low-temperature viscosity of 100,000 mPa·s or less. When the low-temperature viscosity of the refrigerator oil composition is the upper limit value or less, the refrigerator oil composition can have sufficient low-temperature flowability under a low temperature environment, and can exhibit suitable lubricating property, for example, in cold regions. In this point of view, the low-temperature viscosity is more preferably 80,000 mPa·s or less, and further preferably 60,000 mPa·s or less. In the description herein, the low-temperature viscosity means a BF viscosity at −30° C. measured according the measurement method described later.

The refrigerator oil composition of the present invention preferably has a volume resistivity of $2.0 \times 10^8$ Ω·m or more. When the volume resistivity is $2.0 \times 10^8$ Ω·m or more, the refrigerator oil composition has enhanced insulating property, and thereby a leak current of 1 mA or more, which would cause a practical problem, can be prevented from occurring even with an electric driving source, such as an electric car air-conditioner. From the standpoint of the further enhancement of the insulating property, the volume resistivity of the refrigerator oil composition is more preferably $5.0 \times 10^8$ Ω·m or more, and further preferably $1.0 \times 10^9$ Ω·m or more.

The refrigerator oil composition of the present invention preferably has a water content of less than 1,000 ppm, more preferably 300 ppm or less. When the water content is 300 ppm or less, hydrolysis of the polyol ester compound hardly occur, and thereby the stability of the refrigerator oil composition can be enhanced to provide a good lubricating performance for a prolonged period of time. The water content is more preferably 200 ppm or less, and particularly preferably 150 ppm or less. The refrigerator oil composition may be dehydrated with a dehydrating agent, such as a molecular sieve, for achieving the water content of the aforementioned value or less.

[Additives]

The refrigerator oil composition of the present invention may contain at least one additive selected from an extreme pressure agent, an oily agent, an antioxidant, an acid scavenger, an oxygen scavenger, a copper deactivator, a rust inhibitor, a defoaming agent and so on.

Examples of the extreme pressure agent include a phosphorus extreme pressure agent, such as a phosphate ester, an acidic phosphate ester, a phosphite ester, an acidic phosphite ester, and amine salts thereof.

In the phosphorus extreme pressure agent, tricresyl phosphate, trithiophenyl phosphate, tri(nonylphenyl) phosphite, dioleyl hydrogen phosphite, 2-ethylhexyldiphenyl phosphite and the like are particularly preferred from the standpoint of the extreme pressure property, the frictional characteristics and so on.

Examples of the extreme pressure agent also include a metal salt of a carboxylic acid. The metal salt of a carboxylic acid referred herein is preferably a metal salt of a carboxylic acid having a number of carbon atoms of from 3 to 60, and further a fatty acid having a number of carbon atoms of from 3 to 30, and particularly from 12 to 30. Examples thereof also include metal salts of a dimer acid and a trimer acid of the fatty acid, and a dicarboxylic acid having a number of carbon atoms of from 3 to 30. Among these, metal salts of a fatty acid having a number of carbon atoms of from 12 to 30 and a dicarboxylic acid having a number of carbon atoms of from 3 to 30 are particularly preferred.

The metal constituting the metal salt is preferably an alkali metal or an alkaline earth metal, and particularly an alkali metal may be optimum.

Other examples of the extreme pressure agent than those described above include a sulfur extreme pressure agent, such as sulfurized oils and fats, sulfurized fatty acids, sulfurized esters, sulfurized olefins, a dihydrocarbyl polysulfide, a thiocarbamate compound, a thioterpene compound and a dialkyl thiodipropionate compound.

The amount of the extreme pressure agent blended thereto is generally from 0.001 to 5% by mass, and particularly preferably from 0.005 to 3% by mass, based on the total amount of the composition, from the standpoint of the lubricating property and the stability.

The extreme pressure agent may be used solely or as a combination of two or more kinds thereof.

Examples of the oily agent include an aliphatic saturated or unsaturated monocarboxylic acid, such as stearic acid and oleic acid, a polymerized fatty acid, such as a dimer acid and a hydrogenated dimer acid, a hydroxyfatty acid, such as ricinoleic acid and 12-hydroxystearic acid, an aliphatic saturated or unsaturated monohydric alcohol, such as lauryl alcohol and oleyl alcohol, an aliphatic saturated or unsaturated monoamine, such as stearylamine and oleylamine, an aliphatic saturated or unsaturated monocarboxylic acid amide, such as lauric acid amide and oleic acid amid, and a partial ester of a polyhydric alcohol, such as glycerin and sorbitol, and an aliphatic saturated or unsaturated monocarboxylic acid.

These compounds may be used solely or as a combination of two or more kinds thereof. The amount thereof blended is generally selected from a range of from 0.01 to 10% by mass, and preferably from 0.1 to 5% by mass, based on the total amount of the composition.

As the antioxidant, a phenol antioxidant, such as 2,6-di-tert-butyl-4-methylphenol, 2,6-di-tert-butyl-4-ethylphenol and 2,2'-methylenebis(4-methyl-6-tert-butylphenol), or an amine antioxidant, such as phenyl-α-naphthylamine and N,N'-diphenyl-p-phenylenediamine is preferably blended. The antioxidant is blended to the composition in an amount of generally from 0.01 to 5% by mass, and preferably from 0.05 to 3% by mass, from the standpoint of the effect and the economic efficiency.

Examples of the acid scavenger include an epoxy compound, such as phenyl glycidyl ether, an alkyl glycidyl ether, an alkylene glycol glycidyl ether, cyclohexene oxide, an α-olefin oxide and an epoxidized soybean oil. Among these, phenyl glycidyl ether, an alkyl glycidyl ether, an alkylene glycol glycidyl ether, cyclohexene oxide, and an α-olefin oxide are preferred from the standpoint of the compatibility.

The alkyl group of the alkyl glycidyl ether and the alkylene group of the alkylene glycol glycidyl ether each may have a branch, and each generally has a number of carbon atoms of from 3 to 30, preferably from 4 to 24, and particularly from 6 to 16. The α-olefin oxide used generally has a total number of carbon atoms of from 4 to 50, preferably from 4 to 24, and particularly from 6 to 16. In the present invention, the acid scavenger may be used solely or as a combination of two or more kinds thereof. The amount thereof blended is generally from 0.005 to 5% by mass, and particularly preferably from 0.05 to 3% by mass, based on the composition, from the standpoint of the effect and the prevention of sludge generated.

In the present invention, the use of the acid scavenger blended can enhance the stability of the refrigerator oil composition. The combination use thereof with the extreme pressure agent and the antioxidant can exhibit an effect of further enhancing the stability.

Examples of the oxygen scavenger include a sulfur-containing aromatic compound, such as 4,4'-thiobis(3-methyl-6-t-butylphenol), diphenyl sulfide, dioctyldiphenyl sulfide, a dialkyldiphenylene sulfide, benzothiophene, dibenzothiophene, phenothiazine, benzothiapyrane, thiapyrane, thianthrene, dibenzothiapyrane and diphenylene disulfide, an aliphatic unsaturated compound, such as various olefins, dienes and trienes, and a terpene compound having a double bond.

Examples of the copper deactivator include N—(N,N'-dialkylaminomethyl)triazole (the alkyl is an alkyl group having a number of carbon atoms of from 3 to 12).

Examples of the rust inhibitor include a metal sulfonate, an aliphatic amine compound, an organic phosphite ester, an organic phosphate ester, an organic sulfonic acid metal salt, an organic phosphoric acid metal salt, an alkenyl succinate ester and a polyhydric alcohol ester.

Examples of the defoaming agent include a silicone oil and a fluorinated silicone oil.

Other known additive(s) may be blended to the refrigerator oil composition of the present invention in such a range that does not impair the objects of the present invention.

The refrigerator oil composition of the present invention is mixed with the aforementioned refrigerant and used in a refrigerator. The refrigerator has a refrigeration cycle composed of as essential components, a compressor, a condenser, an expansion mechanism (such as an expansion valve), and an evaporator, or a compressor, a condenser, an expansion mechanism, a dryer, and an evaporator.

The mixture of the refrigerator oil composition and the refrigerant is circulated in the refrigeration cycle, and repeatedly absorbs and releases heat through the state transition of vaporization and liquefaction.

The refrigerator oil composition of the present invention can be used, for example, in a refrigeration system, a hot water supply system, or a heating system, such as a car air-conditioner, a gas heat pump (GHP) system, an air conditioner, a refrigerating chamber, an automatic vending machine, a showcase, a hot water supplier, and a floor heater, is preferably used in a car air-conditioner, such as an electric car air-conditioner and an open type car air-conditioner, and is particularly suitable for an electric car air-conditioner.

As described above, the refrigerator oil composition of the present invention contains a polyol ester compound and a polyoxyalkylene glycol compound in the prescribed mass ratio, and thereby the refrigerator oil composition has both a good volume resistivity and good low-temperature flowability.

EXAMPLES

The present invention will be described in more detail with reference to examples below, but the present invention is not limited to the examples.

The properties in the present invention were evaluated in the following manners.

[Evaluation Methods]

(1) Low-Temperature Viscosity (BF Viscosity at −30° C.)

The low-temperature viscosity was measured as a viscosity (BF viscosity, unit: mPa·s) at −30° C. according to the method described in ASTM D2983.

(2) Volume Resistivity

The volume resistivity was measured at room temperature, 25° C., according to JIS C2101-24 (volume resistivity test).

(3) Inflammation Point

The inflammation point was measured by the C.O.C method according to JIS K2265.

(4) Ignition Point

The autoignition point measured according to ASTM E659 was designated as the ignition point.

(5) Hydroxyl Value

The hydroxyl value was measured by the neutralization titration method according to JIS K0070.

(6) Acid Value

The acid value was measure by the indicator method according to the lubricant oil neutralization test method defined in JIS K2501.

(7) Iodine Value

The iodine value was measured according to JIS K0070.

(8) Water Content

The water content was measured by the Karl Fischer titration method according to JIS K2275.

(9) 40° C. Kinetic Viscosity and 100° C. Kinetic Viscosity

The kinetic viscosity was measured with a glass capillary viscometer according to JIS K2283-1983.

(10) Compatibility Test

The refrigerator oil composition and the refrigerant were charged in a mass ratio of 9/1 in a two-layer separation temperature measuring tube (inner capacity: 10 mL) and retained in a thermostatic chamber. The two-layer separation temperature was measured by increasing the temperature of the thermostatic chamber from room temperature (25° C.) to 50° C. at a rate of 1° C. per minute. A specimen that was not separated into two layers until 50° C. is shown as "50<" in the table.

(11) Sealed Tube Test 1

The refrigerator oil composition and HFC1234yf were charged in amounts of 4 mL and 1 g respectively in a glass tube, to which metal catalysts of iron, copper and aluminum were also charged, and the glass tube was sealed. After retaining under the condition of an air pressure of 26.6 kPa and a temperature of 175° C. for 30 days, the appearance of the oil and the appearance of the iron catalyst were visually observed, and the acid value was measured.

(12) Sealed Tube Test 2

The refrigerator oil composition, HFC1234yf, and R134a were charged in amounts of 4 mL, 0.7 g, and 0.3 g respectively in a glass tube, to which metal catalysts of iron, copper and aluminum were also charged, and the glass tube was sealed. After retaining under the condition of an air pressure of 26.6 kPa and a temperature of 175° C. for 30 days, the appearance of the oil and the appearance of the iron catalyst were visually observed, and the acid value was measured.

Examples 1 to 13 and Comparative Examples 1 to 6

Refrigerator oil compositions consisting of base oils having the formulations shown in Tables 1 to 3 were prepared, and measured for the low-temperature viscosity and the volume resistivity. The refrigerator oil compositions (mixed base oils) of Examples and Comparative Examples were also measured for the inflammation point and the 100° C. kinetic viscosity.

TABLE 1

|  |  | Example 1 | Example 2 | Example 3 | Example 4 | Example 5 | Example 6 | Example 7 |
| --- | --- | --- | --- | --- | --- | --- | --- | --- |
| Base oil | POE 1 | 98 | 95 | 90 | 80 | 70 | 50 | 40 |
| (part by mass) | PAG 1 | 2 | 5 | 10 | 20 | 30 | 50 | 60 |
| Evaluation results | Low-temperature viscosity (mPa · s) | 95,483 | 77,777 | 55,800 | 35,500 | 21,800 | 11,400 | 9,000 |
|  | Volume resistivity (Ω · m) | $2.5 \times 10^{10}$ | $1.2 \times 10^{10}$ | $5.9 \times 10^{9}$ | $2.2 \times 10^{9}$ | $1.6 \times 10^{9}$ | $5.7 \times 10^{8}$ | $4.0 \times 10^{8}$ |
|  | Autoignition point | 395 | 393 | 391 | 384 | 378 | 368 | 364 |
|  | 100° C. kinetic viscosity (mm/s$^2$) | 9.6 | 9.598 | 9.594 | 9.586 | 9.577 | 9.561 | 9.533 |

TABLE 2

|  |  | Example 8 | Example 9 | Example 10 | Comparative Example 1 | Comparative Example 2 | Comparative Example 3 | Comparative Example 4 |
| --- | --- | --- | --- | --- | --- | --- | --- | --- |
| Base oil | POE 1 | 30 | 20 | 10 | 100 | 99 | 5 | — |
| (part by mass) | PAG 1 | 70 | 80 | 90 | — | 1 | 95 | 100 |
| Evaluation results | Low-temperature viscosity (mPa · s) | 7,500 | 6,300 | 5,600 | 110,000 | 102,463 | 5,500 | 5,460 |
|  | Volume resistivity (Ω · m) | $3.0 \times 10^{8}$ | $2.5 \times 10^{8}$ | $2.0 \times 10^{8}$ | $3.9 \times 10^{10}$ | $3.0 \times 10^{10}$ | $1.8 \times 10^{8}$ | $1.6 \times 10^{8}$ |
|  | Autoignition point | 360 | 356 | 353 | 396 | 396 | 351 | 350 |
|  | 100° C. kinetic viscosity (mm/s$^2$) | 9.545 | 9.536 | 9.528 | 9.602 | 9.601 | 9.524 | 9.52 |

TABLE 3

|  |  | Example 11 | Example 12 | Example 13 | Comparative Example 5 | Comparative Example 6 |
|---|---|---|---|---|---|---|
| Base oil (part by mass) | POE 2 | 90 | 80 | 70 | 100 | — |
|  | PAG 2 | 10 | 20 | 30 | — | 100 |
| Evaluation results | Low-temperature viscosity (mPa · s) | 73,500 | 54,700 | 40,900 | 100,000 | 6,300 |
|  | Volume resistivity (Ω · m) | $4.3 \times 10^9$ | $1.7 \times 10^9$ | $1.1 \times 10^9$ | $4.1 \times 10^{10}$ | $8.0 \times 10^8$ |
|  | Autoignition point | 390 | 382 | 373 | 392 | 348 |
|  | 100° C. kinetic viscosity (mm/s$^2$) | 8.494 | 8.672 | 8.856 | 8.32 | 10.3 |

*1: In Tables 1 to 3, "—" means no addition.

The compounds in Tables 1 to 3 are as follows.
(Polyol Ester Compound)
POE 1:

An ester of a mixture of pentaerythritol and di(pentaerythritol) (molar mixing ratio: 5/1) and a mixture of 2-ethylhexanoic acid and 3,5,5-trimethylhexanoic acid (molar mixing ratio: 9/10), 40° C. kinetic viscosity: 83.17 mm$^2$/s, 100° C. kinetic viscosity: 9.602 mm$^2$/s, hydroxyl value: 2.39 mgKOH/g, acid value: 0.01 mgKOH/g, iodine value: 2.0
POE 2:

An ester of pentaerythritol and a mixture of 2-ethylhexanoic acid and 3,5,5-trimethylhexanoic acid (molar mixing ratio: 1/1), 40° C. kinetic viscosity: 68.5 mm$^2$/s, 100° C. kinetic viscosity: 8.32 mm$^2$/s, hydroxyl value: 3.2 mgKOH/g, acid value: 0.01 mgKOH/g, iodine value: 1.0 (Polyoxyalkylene Glycol Compound)
PAG 1:

Polypropylene glycol dimethyl ether, 40° C. kinetic viscosity: 42.8 mm$^2$/s, 100° C. kinetic viscosity: 9.52 mm$^2$/s, hydroxyl value: 0.9 mgKOH/g
PAG 2:

Polyoxypropylene-polyoxyethylene copolymer dimethyl ether, polyoxypropylene/polyoxyethylene: 7/3 (molar ratio), 40° C. kinetic viscosity: 43.1 mm$^2$/s, 100° C. kinetic viscosity: 10.3 mm$^2$/s, hydroxyl value: 1.2 mgKOH/g As apparent from the results shown in Tables 1 to 3, the refrigerator oil compositions of Examples 1 to 13 contained the polyol ester compound and the polyoxyalkylene glycol compound in the prescribed mass ratio, and therefore, the volume resistivity was high, and the BF viscosity at −30° C. was low, thereby providing an excellent low-temperature flowability.

On the other hand, in the refrigerator oil compositions of Comparative Examples 1 to 6, the polyol ester compound or the polyoxyalkylene glycol compound was not contained, or the content of one of them was small, and thereby the volume resistivity or the low-temperature flowability was not good.

Examples 14 to 17, Comparative Example 7, and Reference Examples 1 and 2

To the base oils having the mass ratios shown in Table 4, the additives shown in Table 4 were blended to prepare refrigerator oil compositions. The resulting refrigerator oil compositions were subjected to the compatibility test, the sealed tube test 1, and the sealed tube test 2. The refrigerator oil compositions of Examples 14 to 17, Comparative Example 7, and Reference Example 1 were controlled to have a water content of 100 ppm, and that of Reference Example 2 was controlled to have a water content of 1,000 ppm.

TABLE 4

|  |  |  | Example 14 | Example 15 | Example 16 | Example 17 | Comparative Example 7 | Reference Example 1 | Reference Example 2 |
|---|---|---|---|---|---|---|---|---|---|
| Refrigerator oil composition (part by mass) | Base oil | POE 1 | 89 | 79 | 69 | 49 | 100 | — | 69 |
|  |  | PAG 1 | 9 | 19 | 29 | 49 | — | 100 | 29 |
|  | Additive | Acid scavenger | 1 | 1 | 1 | 1 | 1 | 1 | 1 |
|  |  | Antioxidant | 0.5 | 0.5 | 0.5 | 0.5 | 0.5 | 0.5 | 0.5 |
|  |  | Extreme pressure agent | 1 | 1 | 1 | 1 | 1 | 1 | 1 |
|  | Water content (ppm) |  | 100 | 100 | 100 | 100 | 100 | 100 | 1,000 |
| Evaluation result | Compatibility | Two-layer separation temperature (° C.) (oil fraction: 10%) | 50< | 50< | 50< | 50< | 50< | 50< | 50< |
|  | Sealed tube test 1 | Appearance of oil | good | good | good | good | pale yellow | good | yellow |
|  |  | Appearance of Fe catalyst | good | good | good | good | black | good | with copper plating |
|  |  | Acid value (mgKOH/g) | 0.1 | 0.1 | 0.1 | 0.1 | 0.8 | 0.1 | 1.7 |
|  | Sealed tube test 2 | Appearance of oil | good | good | good | good | pale yellow | good | yellow |
|  |  | Appearance of Fe catalyst | good | good | good | good | partially black | good | with copper plating |
|  |  | Acid value (mgKOH/g) | 0.1 | 0.1 | 0.1 | 0.1 | 0.5 | 0.1 | 1.3 |

*1: In Table 4, "—" means no addition.

The base oils in Table 4 were the same as above. The additives were as follows.
Acid scavenger: α-olefin oxide
Antioxidant: 2,6-di-tert-butyl-4-methylphenol
Extreme pressure agent: tricresyl phosphate As apparent from the results shown in Table 4, Comparative Example 7 in which the base oil was composed only of the polyol ester compound showed inferior results in all of the appearance of the oil, the appearance of the catalyst, and the acid value in the sealed tube tests 1 and 2, and thus failed to provide sufficient oxidation stability. On the other hand, as shown in Examples 14 to 17, in the case where the base oil contained the polyoxyalkylene glycol compound in the prescribed amount or more in addition to the polyol ester compound, good results were obtained in all of the appearance of the oil, the appearance of the catalyst, and the acid value in the sealed tube tests 1 and 2, and thus excellent oxidation stability was obtained, as similar to Reference Example 1 in which the base oil was composed only of the polyoxyalkylene glycol compound. Reference Example 2 having an increased water content failed to provide an excellent result for the oxidation stability.

INDUSTRIAL APPLICABILITY

The refrigerator oil composition of the present invention can be applied to a refrigeration system, a hot water supply system, or a heating system, such as a car air-conditioner, a gas heat pump (GHP) system, an air conditioner, a refrigerating chamber, an automatic vending machine, a showcase, a hot water supplier and a floor heating system, and may be preferably applied to a car air-conditioner, such as an electric car air-conditioner and an open type car air-conditioner.

The invention claimed is:

1. A refrigerator oil composition, comprising:
a refrigerant comprising as a major component at least one fluorine-containing organic compound of formula (A):

$$C_pF_rR_s \qquad (A),$$

wherein:
R represents Cl, Br, I, or H;
p represents an integer of from 2 to 6;
r represents an integer of from 1 to 12; and
s represents an integer of from 0 to 11,
with the proviso that the fluorine-containing organic compound has one or more carbon-carbon unsaturated bond; and
a polyol ester compound and a polyoxyalkylene glycol compound as a base oil in a mass ratio of from 10/90 to 98/2,
wherein the polyol ester compound is made from a mixture of pentaerythritol and di(pentaerythritol) and one or more C4-C10 branched fatty acids, and
wherein the polyoxyalkylene glycol compound is at least one selected from the group consisting of a polyoxyethylene glycol dimethyl ether homopolymer, a polyoxypropylene glycol dimethyl ether homopolymer and a polyoxypropylene-polyoxyethylene glycol dimethyl ether copolymer.

2. The refrigerator oil composition according to claim 1, wherein the refrigerator oil composition has a BF viscosity at −30° C. of 100,000 mPa·s or less and a volume resistivity of 2.0×10$^8$ Ω·m or more.

3. The refrigerator oil composition according to claim 1, wherein a mixture of the polyol ester compound and the polyoxyalkylene glycol compound has a kinetic viscosity at 100° C. of from 2 to 50 mm$^2$/s.

4. The refrigerator oil composition according to claim 1, wherein the polyol ester compound has a hydroxyl value of 5 mgKOH/g or less and an acid value of 0.1 mgKOH/g or less.

5. The refrigerator oil composition according to claim 1, wherein the refrigerator oil composition has a water content of less than 1,000 ppm.

6. The refrigerator oil composition according to claim 1, wherein the refrigerator oil composition further comprises at least one selected from the group consisting of an antioxidant, an extreme pressure agent, an oily agent, an acid scavenger, an oxygen scavenger, a copper deactivator, a rust inhibitor, and a defoaming agent.

7. The refrigerator oil composition according to claim 1, wherein the fluorine-containing organic compound is an unsaturated fluorinated hydrocarbon compound.

8. The refrigerator oil composition according to claim 7, wherein the unsaturated fluorinated hydrocarbon compound is selected from 1,3,3,3-tetrafluoropropene and 2,3,3,3-tetrafluoropropene.

9. The refrigerator oil composition according to claim 1, wherein the refrigerator oil composition is adapted to function as an oil composition for a refrigeration system, a hot water supply system, or a heating system selected from the group consisting of a car air-conditioner, a gas heat pump, an air conditioner, a refrigerating chamber, an automatic vending machine, and a showcase.

10. The refrigerator oil composition according to claim 1, wherein the polyol ester compound and the polyoxyalkylene glycol compound are present in a mass ratio of from 50/50 to 90/10.

11. The refrigerator oil composition according to claim 1, wherein the polyol ester compound and the polyoxyalkylene glycol compound are present in a mass ratio of from 80/20 to 95/5.

12. The refrigerator oil composition according to claim 1, wherein the polyol ester compound is made from a mixture of pentaerythritol and di(pentaerythritol) and at least one C4-C10 branched fatty acid selected from the group consisting of 2 ethylhexanoic acid and 3,5,5-trimethylhexanoic acid.

13. The refrigerator oil composition according to claim 1, consisting essentially of the fluorine-containing organic compound of formula (A), the polyol ester compound and the polyoxyalkylene glycol compound.

14. The refrigerator oil composition according to claim 1, wherein the polyol ester compound is made from a mixture of pentaerythritol and di(pentaerythritol) and a mixture of 2-ethylhexanoic acid and 3,5,5-trimethylhexanoic acid, and the polyoxyalkylene glycol compound is at least one selected from the group consisting of a polyoxypropylene glycol dimethyl ether homopolymer and a polyoxypropylene-polyoxyethylene copolymer dimethyl ether.

* * * * *